United States Patent [19]

Barecki

[11] 4,040,660
[45] Aug. 9, 1977

[54] ADJUSTABLE BACK SEAT WITH REDUCED MOMENT ARM

[75] Inventor: Chester J. Barecki, Grand Rapids, Mich.

[73] Assignee: American Seating Company, Grand Rapids, Mich.

[21] Appl. No.: 723,202

[22] Filed: Sept. 14, 1976

Related U.S. Application Data

[63] Continuation-in-part of Ser. No. 602,882, Aug. 7, 1975, abandoned.

[51] Int. Cl.² .............................................. A62B 35/00
[52] U.S. Cl. ................................... 297/389; 297/216; 297/354; 297/388
[58] Field of Search ................................ 280/744, 747; 244/122 R, 122 B; 297/216, 384, 388, 389, 386, 379, 378, 353, 354

[56] References Cited

U.S. PATENT DOCUMENTS

| | | | |
|---|---|---|---|
| 3,488,090 | 1/1970 | Douglas | 280/747 X |
| 3,515,433 | 6/1970 | Tabor | 297/379 X |
| 3,620,569 | 11/1971 | Mathis | 280/747 X |
| 3,638,999 | 2/1972 | Tischler | 297/379 |
| 3,761,127 | 9/1973 | Giese | 297/389 |
| 3,822,914 | 7/1974 | Iida | 297/216 |
| 3,877,748 | 4/1975 | Eggert | 297/216 |
| 3,929,205 | 12/1975 | Takada | 280/747 X |

FOREIGN PATENT DOCUMENTS

| | | | |
|---|---|---|---|
| 727,445 | 3/1955 | United Kingdom | 297/378 |

*Primary Examiner*—James T. McCall
*Attorney, Agent, or Firm*—Price, Heneveld, Huizenga & Cooper

[57] ABSTRACT

An adjustable back vehicle seat has a means of reducing the moment arm of the seat back to a length less than the full length of the seat back. The seat has a back adjustment mechanism with the above said means providing a stop means for limiting the forwardly rotating movement of the seat back in event a force applied to the back overcomes the holding force of such mechanism. In one embodiment the seat is a driver's seat having a shoulder harness. In another embodiment the seat is a passenger seat.

23 Claims, 10 Drawing Figures

ADJUSTABLE BACK SEAT WITH REDUCED MOMENT ARM

This is a continuation-in-part of application Ser. No. 602,882, filed Aug. 7, 1975 now abandoned.

BACKGROUND OF THE INVENTION

The present invention relates to a transit vehicle seat; and, in particular, to a transit vehicle seat with an adjustable back.

The prior art teaches various means of reinforcing vehicle seat backs to withstand the application of a force to the seat back. For example, heavy duty frames of relatively stronger materials have been used. Such frames have increased the cost of the seats and such increased costs have made the seats generally unacceptable for use in transit vehicles requiring great numbers of such seats. The prior art also teaches various structural bracing members coupled to the seat back to support the seat back. However, such means have had limited applicability to use with an adjustable seat back because of the movement required of the seat back. Some of the difficulties of withstanding a force applied to and adjustable seat back are overcome by this invention.

SUMMARY OF THE INVENTION

A vehicle seat in accordance with this invention uses a back stop to limit the forward motion of an adjustable seat back in the event that a force applied to the seat back overcomes the holding ability of the seat back adjustment mechanism. The back stop restrains movement of the seat back in such a way as to shorten the moment arm of the force applied to the seat back. This is advantageous because just when a force has overcome the holding ability of the adjustment mechanism the momemt arm of the force is reduced thereby decreasing the torque which the vehicle seat must withstand. The adjustment of the back includes reclining the seat back to any of a plurality of positions, accommodating different occupants and to vary seat support during extended periods in the vehicle seat. Thus an improvement in comfort is coupled with an improvement in the ability of the chair to withstand applied forces.

A seat in accordance with this invention has a moment arm reduced from the full length of the seat back. The back of the seat is supported by a back frame which is pivotally attached to a seat frame thereby allowing the seat back to adjust. The seat frame extends rearward along the sides of the seat to the seat back and then has a vertical extension which extends upward. The back frame is connected to this vertical extension of the seat frame at a pivot point. A portion of the back frame connected to an adjustment mechanism to permit securing the seat back in a plurality of adjusted or reclined positions or an upright position.

The seat frame extends upward further than the pivot point and can engage the back frame thereby limiting forward motion of the seat back by means of a back support stop pin extending laterally from either the seat frame or the back frame. If the back support stop pin is attached to the back frame and the back is adjusted at a tilt, the stop pin is spaced from the vertical extension of the seat frame. When the stop pin engages the seat frame, the stop pin shortens the length of the moment arm about which a force is applied to the back frame.

Examples of typical forces applied to seat backs include a passenger behind the seat back being thrown forward into the seat back during a collision or sudden stop and the forward pull of a seat occupant restraining device, such as a shoulder harness, coupled to the seat back. A reduced moment arm is advantageous in reducing the strength required in the seat back frame to prevent the bending of the seat back when a force is applied to the seat back. Also, the adjustment mechanism is not required to sustain forces exerted on the seat back. Such reduced strength requirements typically result in reduced cost of manufacture and reduced final weight of the seat, which is often an advantage in transportation vehicles. Furthermore, the seat and restraining device can be conveniently used when facing forward as would be required by the driver of a transportation vehicle.

DETAILED DESCRIPTION

Figure 1:
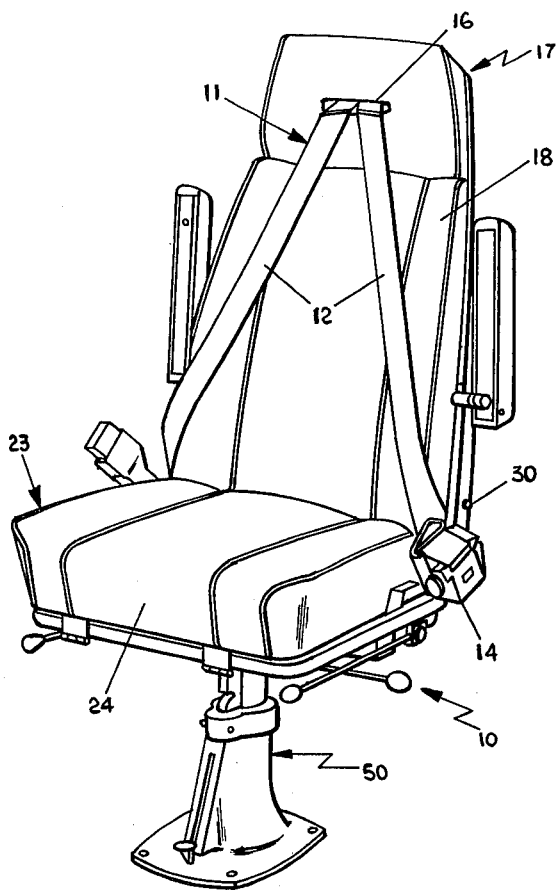
FIG. 1 shows a frontal perpective view of a driver's seat with adjustable back in accordance with an embodiment of this invention.

Referring to the drawing, a high back driver seat 10 is shown having a seat assembly 23, a back assembly 17, a base assembly 50, and adjustment mechanism 45 and a harness assembly 11.

Figure 4:
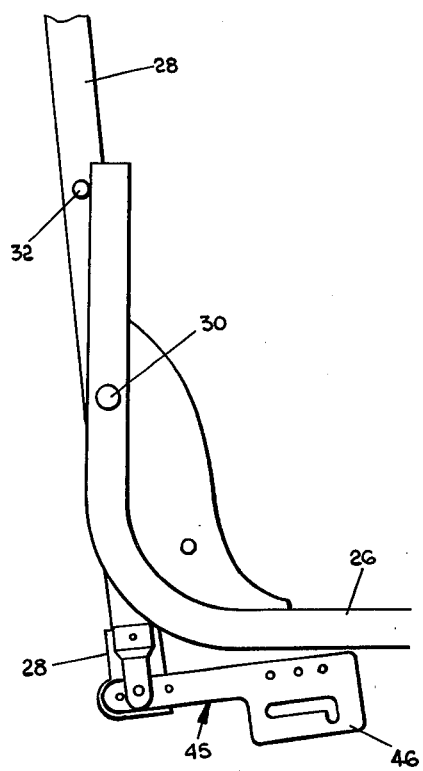
FIG. 4 shows a side view of the pivot and stop pins of the seat of FIG. 1.
Figure 2:
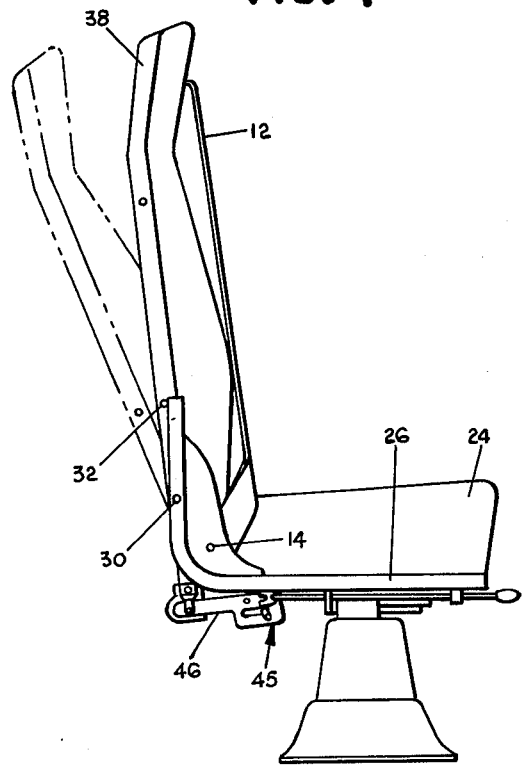
FIG. 2 shows a partial side view of the seat of FIG. 1.
Figure 6:
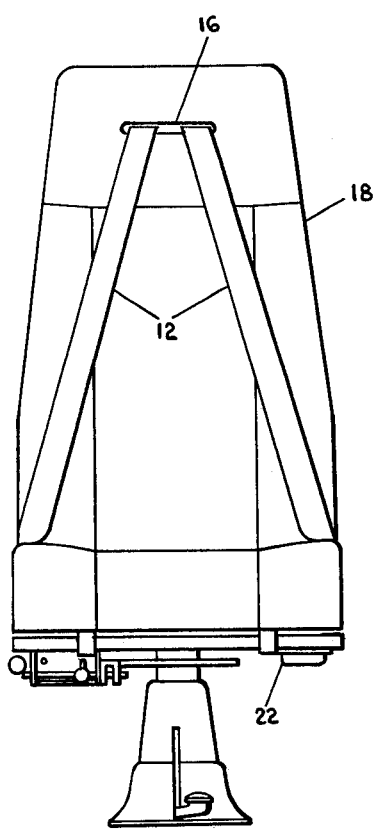
FIG. 6 shows a partial frontal elevation view of the seat of FIG. 1.

Seat assembly 23 includes a seat portion 24 and a seat frame 26. As shown in FIG. 2 and partially in FIG. 4, seat frame 26 extends around the bottom of seat portion 24 and back to the rear part of seat portion 24 and then extends vertically upward. Frame gussets 14 are typically generally triangular in shape and are connected along two edges of gussett 14 to a horizontal portion and a vertical portion on each side of seat frame 26 adjacent the junctions of the rearward and vertically extending portions of seat frame 26. Frame gussets 14 provide a bracing support for seat frame 26. Typically, seat portion 24 includes a padding material covered by an upholstery material.

Figure 5:
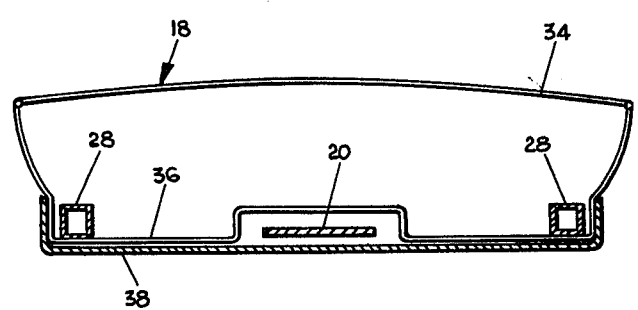
FIG. 5 shows a cross section taken along section line V—V of FIG. 3.

Back assembly 17 includes a back portion 18 having a cushioning material covered by an upholstery material 34. A slotted opening 16 in back portion 18 is provided to receive part of harness assembly 11. Back assembly 17 contains a supporting back frame 28 which is connected to seat frame 26 by a pivot pin 30. A back support stop pin 32 protrudes sideways from back frame 28 and is aligned to engage the vertical extension of seat frame 26 at a restraining point when back frame 28 rotates forward. As can be seen from FIG. 5, which is a cross section taken along section line V—V of FIG. 3, back assembly 17 includes a seat back shell portion 36 connected to back frame 28 and a back cover 38 covering seat back shell portion 36 and connected to back frame 28. Seat shell 36 has a recessed channel in which passes a portion of harness assembly 11.

Slotting opening 16 has a reinforcing ring 40 surrounding it and located within back portion 18. Weld pins 42 connect ring 40 to back frame 28. A back support cross frame 44 is connected at each end to back frame 28 and at an intermediate point to ring 40 thereby providing a diagonal support for back frame 28. A roller 41 mounted on back support cross frame 44 helps provide for free movement of a portion of harness assembly 11 over cross frame 44. Ring 40, pins 42, back support cross frame 44 and back frame 28 cooperate to support harness assembly 11 as it passes through opening 16. Accordingly, forces exerted on harness assembly 11 are applied to back frame 28 at the location of slot 16.

Base assembly 50 supports chair 10 and is connected to seat assembly 23. Advantageously, base assembly 50 including a conventional mechanism for raising and lowering seat 10. Typically, a column having notches is connected to the bottom portion of seat assembly 23 and travels vertically within a base mounted to the floor.

Figure 3:
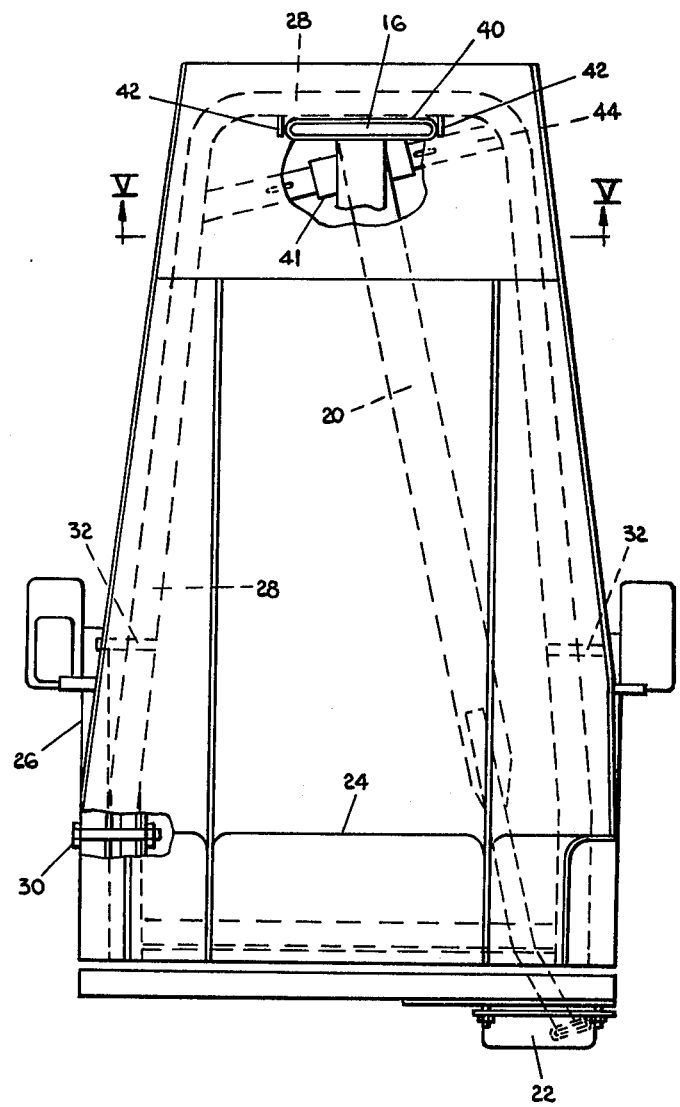
FIG. 3 shows a partial front elevation view of the seat of FIG. 1.
Figure 7:
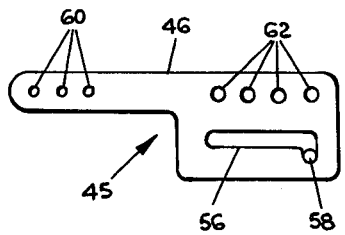
FIG. 7 shows a partial side view of a part of an adjustment mechanism for the seat of FIG. 1.

Harness assembly 11 has shoulder harness straps 12 extending from frame gussets 14 attached to a portion of frame 26 to slotting opening 16. The two shoulder harness straps 12 can converge into a single strap 20. As shown in FIG. 3, it is this single strap 20 which extends within the recessed channel in seat shell 36 down to an inertia reel 22 below seat assembly 23. Typically, inertia reel 22 is mounted on a portion of seat 10.

Adjustment mechanism 45 secures back assembly 17 at a plurality of tilted positions. The lower end of back frame 28 is hingedly connected to a connecting plate 46. Plate 46 is hingedly connected to seat frame 26. Plate 46 has a plurality of engaging openings 60 and 62 so the location of its hinged connection to seat frame 26 and to back frame 28 can be varied thereby changing the adjusted tilt angle of back 18. These openings comprise a plurality of range holes 60 spaced in a horizontal direction at the rearward portion of plate 46 and a plurality of position holes 62 spaced in a horizontal direction at the forward portion of plate 46. Typically, a spring biased plunger connected to back frame 28 is inserted into one of range holes 60; and a position rod connected to seat frame 26 and controllable from the front of seat 10 by the driver is inserted into one of position holes 62. Plate 46 has a horizontally extending guide slot 56 through which extends a guide rod 58 connected to seat assembly 23. The slot and rod combination support and guide the movement of plate 46 while back assembly 17 is being adjusted.

Figure 8:
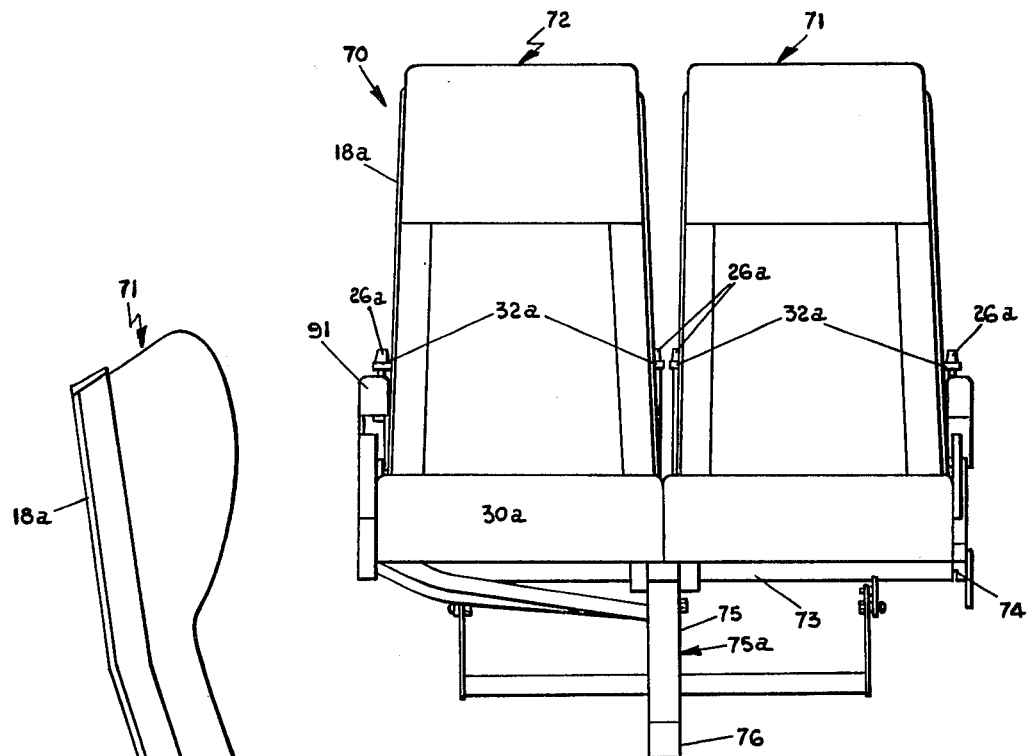
FIG. 8 is a rear elevation view of a passenger seat constituting another embodiment of this invention.
Figure 9:
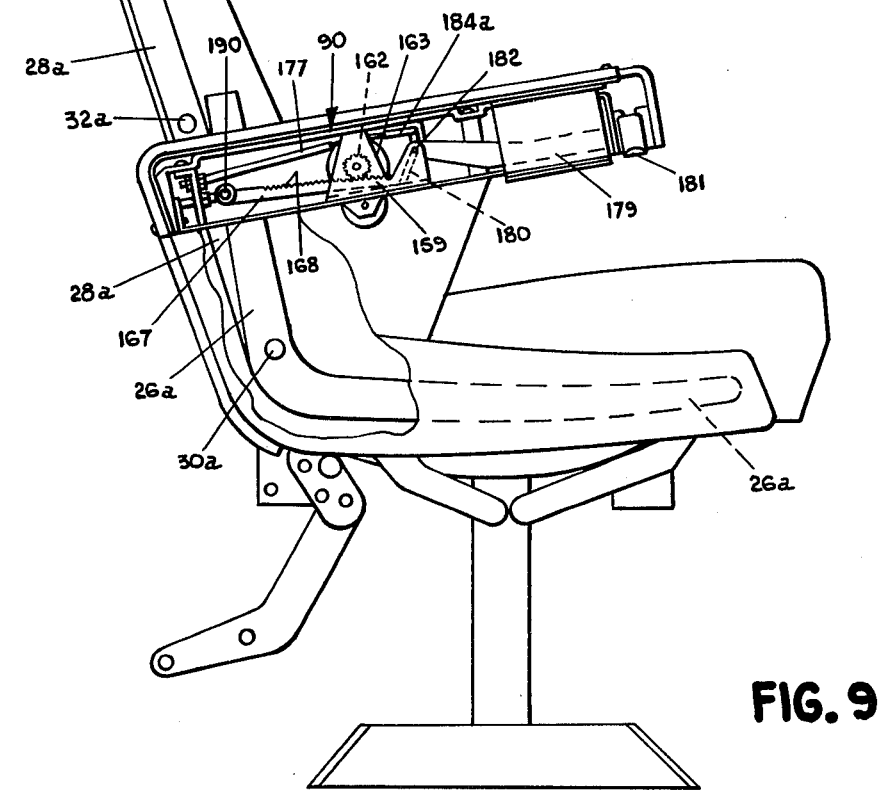
FIG. 9 is a side elevation view, partly broken away, of the embodiment of FIG. 8 showing means for reducing the moment arm of the seat back.

Referring to FIGS. 8 and 9, a transit passenger chair 70 comprises two separate side-by-side seat structures 71 and 72. A reclining seat back 18a rotates about a pivot pin 30a. As in the embodiment shown in FIG. 1, there are means for reducing the moment arm of a force coupled to the seat back so the moment arm is less than the distance from the pivot point to the coupling point of the force thereby decreasing the torque applied to the seat back. More specifically, a back support stop pin 32a extends transversely out from back frame 28a so pin 32a engages an upward extension of seat frame 26a when back 18a is rotated sufficiently forward. The embodiment shown in FIG. 8 is particularly advantageous for use as passenger seats and is particularly well suited to withstand the forward force of a passenger sitting in a seat behind back 18a and thrown forward into back 18a as a result of a collision or sudden stop. An adjustment mechanism 90 in an arm 91 (FIG. 9) secures the back a plurality of reclined positions. The reclining adjustment mechanism is taught in U.S. Pat. No. 3,695,707, issued to C. J. Barecki et al on Oct. 3, 1972, and U.S. Pat. No. 3,744,843 issued to C. J. Barecki et al on July 10, 1973, the disclosure of which are hereby incorporated by reference.

Briefly, the adjustment mechanism includes a rack gear 167 with a series of teeth 168 that engages the teeth of a pinion gear 162. The rearward end of rack gear 167 is coupled to a pin 190 which is in turn coupled to back frame 28a and thus controls adjustment of back 18a. The movement of the rack gear is controlled by the gripping and releasing of a pulley 163 by a cable 177 as an activating lever 179 is held down by a spring 180 or raised by an operator's finger raising a knob 181. The activating lever 179 is anchored by the pin 182 onto the mechanism bracket 159. The cable 177 is attached to the activating level at connection 184a by a cotter pin. The knob 181 is attached to an activating lever 179 by two rivets. The back is held firmly in position by cable 177 gripping pulley 163 until knob 181 is raised by the operator's fingers. This raises the activating lever 179 producing sufficient slack in the cable to allow the pulley to turn freely, which in turn permits the pinion gear to turn, freeing the rack gear to slide backward or forward, moving the back.

During a collision, a passenger behind chair 70 may be thrown forward thereby applying a force to seat back 18a tending to push it forward. In the event the adjustment mechanism holding the seat back in the reclined position is unable to withstand the force applied to the seat back and continue to hold the seat back in the reclined position, the stop means, including stop pin 32a, acts to limit forward rotational movement of the seat back. Without the restraint provided by the adjustment mechanism, the seat back is free to move forward to a position where the stop means limits motion. When stop pin 32a engages seat frame 26a, the moment arm of the applied force is reduced by the distance between pivot pin 30a and stop pin 32a. Such a reduction in the moment arm reduces the moment of the force applied to the seat back by the passenger thrown into the seat back. Accordingly, not only is forward movement of the seat back stopped, but the seat back is better able to withstand the force applied by the passenger because of the reduced moment arm of the force thus reducing the applied torque.

Figure 10:
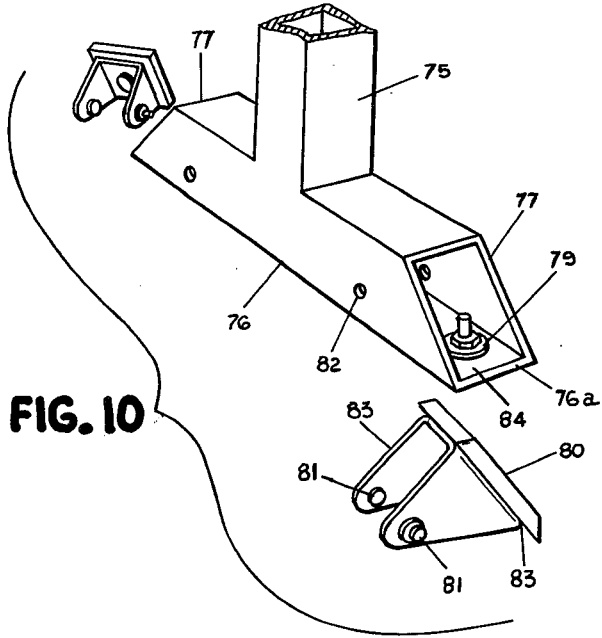
FIG. 10 is an exploded perspective view of the foot structure shown in FIG. 8 but with the end caps removed to expose the attachment means.

Referring to FIG. 8, transit chair 70 is mounted on a chair frame 73. The frame may be attached to the wall of the coach or vehicle by use of a short length of angle iron 74. The beam is supported by a single column pedestal 75 located about the midway between the seats to afford maximum leg room without depriving the chair of needed support. The pedestal 75 is attached to the floor by the use of the elongated tube or foot 76 which extends in a direction longitudinally of the coach floor and includes a flat bottom plate 16a resting on the vehicle floor and secured to it. As shown in FIG. 10, the foot is substantially square in cross section and has its ends 77 cut away at an angle preferably about 45° to permit the use of a socket wrench to tighten the attachment nuts or bolts 79 which are received in bolt holes at each end of bottom plate 76a. Hence, the fastening bolts are located in fore and aft positions relative to the single vertical column 75, and they extend at least partially within the hollow foot member 76. A single pedestal transit chair is further described in U.S. Pat. No. 3,729,226 issued to C. J. Barecki on Apr. 24, 1973, the disclosure of which is hereby incorporated by reference.

End caps 80 are locked in place automatically by having two shoulder rivets or lugs 81 snap into receiving holes 82 as the two spring fingers or wings 83 of the end cap are pressed inside the foot tube and along its bottom edge 84. When locked in place, the shoulder rivets or lugs hold the end cap 80 firmly against the opening 77 at each end of the foot 76. To remove the cap, rivet lugs 81 should be pressed inwardly to clear the openings 82 and the closure withdrawn. This structure prevents unauthorized removal. If desired, a special tool may be employed for simultaneously pushing the shoulder rivets inwardly on each side of the holes and thus facilitating the removal of the caps.

OPERATION

Referring to the embodiment shown in FIG. 1, the occupant sits in seat 10 and places harness straps 12 over his shoulders. Inertia reel 22 releases strap 20 and allows it to pass through opening 16. However, as is known in connection with inertia reels, a sudden movement of the occupant jerks harness straps 12 and 20 and locks inertia reel 22. Such a jerk applies force to seat back 18 about its pivot point at pin 30. More specifically, force is applied to seat back 18 at slot 16 by strap 20 forcing the back to pivot forwardly. In turn, the force applied to the back at ring 40 applies a moment of force, or torque, to back frame 28 about pivot pin 30. As is known, a moment of force or torque is equal to the product of a force and a moment arm between a reference point, about which rotation can take place, and the point of application of the force. In this case, the torque is equal to the force applied to the back at the slot 16 multiplied by the distance from slot 16 to pivot pin 30.

If back 18 is to be restrained from moving forward then adjustment mechanism 45 must provide an equal and counteracting torque. Since the moment arm from plate 46 of adjustment mechanism 45 to pivot pin 30 is significantly shorter than the moment arm from slot 16 to pivot pin 30, plate 46 must provide a greater force than that applied to the back at slot 16 by straps 12 and 20. To restrain seat back 18 from movement, back frame 28 and adjustment mechanism 45 must be constructed with sufficient strength to sustain such applied forces due to occupant restraint. Such construction is undesirable because of the additional cost, weight, materials and labor required.

In accordance with an embodiment of this invention, seat back 18 is permitted to move forward until back support stop pin 32 engages seat frame 26. No part of adjustment mechanism 45 is required to sustain any abnormal forces and can be constructed less rigidly thereby reducing costs. Also, the moment arm of the applied force on back frame 28 at opening 16 is reduced by an amount equal to the distance between back support stop pin 32 and pivot pin 30. Since the moment arm is reduced, the torque is correspondingly reduced and frame 28 can be of less rigid construction and therefore less costly. Counteracting the force applied as slot 16 about back support stop in 32 is a force at pivot pin 30. This is advantageous because it is easier to make pivot pin 30 capable of withstanding such abnormal forces as those experienced during collision than it is to make adjustment mechanism 45 withstand such forces. In contrast to the connection of adjustment mechanism 45, pin 30 can be closely coupled to seat frame 26 and back frame 28. The permanent relationship of pin 30 and frames 26 and 28 can be made more secure than the adjustable relationship of adjustment mechanism 45 and frames 26 and 28.

It can also be appreciated that providing a slotted opening spaced from the top of seat back 18 reduces the moment arm. Without an opening, the shoulder harness would have to pass over or be connected to the top of seat back 18. Accordingly, the length of the moment arm would be from the top of seat back 18 to back support stop pin 32. The spacing of slotted opening 16 from the top of seat back 18 reduces the moment arm of the force applied by the shoulder harness by a corresponding amount. Since the portion of seat back 18 about opening 16 must not sustain any forces produced by the shoulder harness, it must be sufficiently rigid to support only such forces as those created, for example, by whiplash of the driver's head. Reducing the requirements for structural support at the top of the seat back also reduces cost, weight, materials and labor required.

When seat back 18 is adjusted to tilt from the vertical back support pin 32 is displaced from seat frame 26. If a substantial force is applied to shoulder harness straps 12 then adjustment mechanism 45 is not expected to withstand it and seat back 18 will rotate forward until stop pin 32 engages seat frame 26. At the engagement of stop pin 32 with seat frame 26, seat back 18 will stop rotating forward and harness straps 12 will restrain the driver. Test have shown that this loss of restraint by the adjustment mechanism 45 and subsequent restraint by back support pin 32 in combination with seat frame 26 is not injurious to the occupant. The occupant feels a jerk when chair back 18 reaches a vertical position and his forward motion is restrained by the shoulder harness.

A high back seat in accordance with an embodiment of this invention meets loading requirements in accordance with Federal Motor Vehicle Safety Standards (F.M.V.S.S.). For example, in accordance with F.M.V.S.S. No. 207, paragraph S.4.2(c), the seat can withstand 2100 lbs. (20G's) and in accordance with F.M.V.S.S. No. 210, paragraph S.4. 2.1, the seat can withstand 5000 lbs. for a total of 7100 lbs. In accordance with F.M.V.S.S. No. 207, paragraph S.4.2(c), the seat can withstand 2100 lbs. (20 G's) and in accordance with F.M.V.S.S. No. 210, paragraph S.4.2.2, the seat can withstand 3000 lbs. for a total of 5100 lbs. In accordance with F.M.V.S.S. No. 210, paragraph S.4.2.2, the seat can withstand 3000 lbs. A typical construction in accordance with an embodiment of this invention includes tubular metal members for frames 26, 26a, 28 and 28a.

The reduction in the length of the moment arm permits a shoulder harness to be coupled to the back portion of a high back seat instead of, say, to an overhead ceiling beam, and does not require the entire seat back to be reinforced to sustain the load. In effect, the back frame is selectively reinforced by the combination of the seat frame and back support stop pin with the back frame. Coupling the shoulder harness to the seat back rather than the ceiling or floor provides better restraint of the occupant and improves safety. A particularly advantageous location for coupling the shoulder harness to the seat back is approximately at shoulder height of the occupant. A coupling point too much below the shoulders may permit the shoulders to rotate about the coupling point causing injury to the occupant. A coupling point too much above the shoulders may permit lateral and upward movement of the occupant also causing injury.

Although the preceding discussion has been directed toward the embodiment shown in FIGS. 1–7, much of it is applicable to the embodiment shown in FIGS. 8–10. As already noted, the force applied to seat back 18a is typically a passenger behind the seat being thrown into it because of a collision or sudden stop. Therefore, as before, the moment arm of the applied force on back frame 28a is reduced by an amount equal to the distance between back support stop pin 32a and pivot pin 30a. Since the moment arm is reduced, the torque is correspondingly reduced and the back will withstand greater forces. This is important since the back will tend to compartmentalize the passenger so as to prevent the passenger from being catapulted over the seat. In cooperation with this function of the back of the seat, the inverted T pedestal 75a provides a means for absorbing the energy of the passenger as he strikes the seat. The force exerted by the passenger is absorbed not only by the back as it deforms but also by the hollow upright column 75 and hollow foot member 76 as they bend and deform. Thus the combination helps to hold the passenger between two seats located one behind the other and also provides energy absorption for reducing the incidents of injury.

Various modifications and variations will no doubt occur to those skilled in the various arts to which this invention pertains. For example, coupling of the shoulder harness to the seat back may be varied from the disclosed single slot extending partially through the seat back. These and all other variations which basically rely on the teachings through which this disclosure has advanced the art are properly considered within the scope of this invention.

The embodiments of the invention in which an exclusive property or privilege is claimed are defined as follows.

1. A vehicle seat having a movable back and a seat frame, said seat back being pivotally mounted about a pivot point comprising:
   means for reducing the moment arm of a force applied to the seat back at an application point so the moment arm is less than the distance from the pivot point to the application point thereby decreasing the torque applied to the seat back, said means for reducing the moment arm comprising:
   a back support stop means extending from one of said seat back or seat frame and spaced from the pivot point, said stop means being positioned to engage the other of said seat back or seat frame at a restraining point when the back is not in a backwardly pivoted position.

2. A vehicle seat comprised of a combination of at least two seats as recited in claim 1 coupled side by side to form a multiple passenger vehicle chair comprising: a chair frame, including said seat frame, having an aisle side and a wall side, said chair frame supporting said vehicle seats, mounting means on said wall side of said chair frame for securing said chair frame to the vehicle wall; a single pedestal cooperating with said wall to support said chair frame, said pedestal being spaced at an intermediate location between said wall side and said aisle side of said chair frame and including an upright column rigidly connected at its top to said chair frame, a hollow tubular foot member integral with the bottom of said column and extending forwardly and rearwardly therefrom, said foot being secured to the floor of a vehicle.

3. A vehicle seat as recited in claim 1 wherein:
   the seat back includes a back frame connected to the pivot point;
   a seat frame extending generally horizontally backward along the side of the vehicle seat and generally vertically upward along and adjacent the back frame;
   said back frame being pivotally connected to the seat frame at the said pivot point; and
   said stop means aligned to engage said other of said seat back or seat frame.

4. A vehicle seat as recited in claim 3 further comprising adjustment means coupled to said back portion for holding said back portion in one of several different positions.

5. A vehicle seat as recited in claim 1 wherein:
   said seat back includes a back frame connected to said pivot point;
   a seat frame extends generally horizontally backward along at least one side of the vehicle seat and generally vertically upward along and adjacent the back frame;
   said back frame is pivotally connected to said seat frame at said pivot point;
   said back support stop means is aligned to engage said other of said seat back or seat frame; and further comprising:
   adjustment means coupled to said seat back for holding said seat back in one of a plurality of reclined positions with respect to said seat frame.

6. A vehicle seat as recited in claim 5 wherein said adjustment means is coupled to said back frame above said pivot point.

7. A vehicle seat comprised of a combination of at least two seats as recited in claim 5 coupled side by side to form a multiple passenger vehicle chair comprising: a chair frame, including said seat frame, having an aisle side and a wall side, said chair frame supporting said vehicle seats, mounting means on said wall side of said chair frame for securing said chair frame to the vehicle wall; a single pedestal cooperating with said wall to support said chair frame, said pedestal being spaced at an intermediate location between said wall side and said aisle side of said chair frame and including an upright column rigidly connected at its top to said chair frame, a hollow tubular foot member integral with the bottom of said column and extending forwardly and rearwardly therefrom, said foot being secured to the floor of a vehicle.

8. A vehicle seat having an adjustable back portion comprising:
   a seat back frame within the seat back, including connected structural members at the sides of the seat back;
   a seat frame laterally surrounding a portion of the perimeter of the seat, extending rearward in a generally horizontal plane and then extending generally vertically upward to form an upright portion adjacent to at least a portion of the seat back frame;
   a pivot means pivotally connecting the seat frame and the seat back frame at a pivot point; and
   a back support stop means spaced from the pivot means, extending outwardly from one of said upright portion or said seat back frame above the pivot point for engaging the other of said upright portion or said seat back frame and for limiting forward pivotal movement of the back portion.

9. A vehicle seat as recited in claim 8 further comprising:
   a slotted opening in the back portion extending partially through the back portion and spaced from the top of the back portion;
   a shoulder harness having a first and a second extremity and extending through the slotted opening thereby coupling the shoulder harness to the back portion, the first extremity connected to the vehicle seat;
   an inertial reel mounted on the vehicle seat and connected to the second extremity of the shoulder harness; and
   said seat back frame including structural members laterally surrounding the slotted opening in the seat back.

10. A vehicle seat as recited in claim 9 further comprising adjustment means coupled to said back portion for holding said back portion in one of several different positions.

11. A vehicle seat having an adjustable back portion rotating about a pivot point and means for reducing the moment arm of a force applied to the seat back at an application point so the moment arm is less than the distance from the pivot point to the application point thereby decreasing the torque applied to the seat back comprising:
   a seat back frame within the seat back, including connected tubular members at each of the sides of the seat back;
   a seat frame including a tubular member having a portion extending along the sides of the seat, terminating in upright portions extending upwardly along each side of the back frame, and pivotally connected to said seat back frame at a pivot point below the upper ends of said upright portions; and
   a back support stop means spaced from the pivot point, extending outwardly from one of said upright portions or said seat back frame above the pivot point for engaging the other of said upright portions or said seat back frame and for limiting forward pivotal movement of the back portion.

12. A vehicle seat as recited in claim 11 further comprising adjustment means coupled to said back portion for holding said back portion in one of several different positions.

13. A vehicle seat as recited in claim 12 further comprising:
   a slotted opening in the back portion extending partially through the back portion and spaced from the top of the back portion;
   a shoulder harness having a first and a second extremity and extending through the slotted opening thereby coupling the shoulder harness to the back portion, the first extremity connected to the vehicle seat;
   an inertial reel mounted on the vehicle seat and connected to the second extremity of the shoulder harness; and
   said seat back frame including structural members laterally surrounding the slotted opening in the seat back.

14. A vehicle seat having an adjustable back rotating about a pivot point comprising:
   occupant restraining means coupled to the adjustable back at a coupling point and connected to the vehicle seat for limiting movement of the occupant from the seat;
   means for reducing the moment arm of a force coupled to the seat back by the restraining means so the moment arm is less than the distance from the pivot point to the coupling point thereby decreasing the torque applied to the seat back, said means for reducing the moment arm comprising:
   a back support stop means extending from the seat back, spaced from the pivot point and positioned to engage a portion of the vehicle seat at a restraining point when the back is not in a backwardly adjusted position.

15. A vehicle seat as recited in claim 14 wherein:
   the seat back includes a back frame connected to the pivot point and having said stop means extending from the sides thereof; and
   a seat frame extending generally horizontally backward along the side of the vehicle seat and generally vertically upward along the seat back, said back frame being pivotally connected to the seat frame at the pivot point, and said seat frame being aligned to engage the back support stop means.

16. A vehicle seat as recited in claim 15 further comprising:
   a connecting plate spaced from the pivot point and hingedly connected to the seat frame and the back frame; and
   engaging means at the hinged connections of the connecting plate for engaging the back frame and the seat frame at a plurality of positions thereby securing the seat back in a plurality of positions with respect to the vertical.

17. A vehicle seat as recited in claim 16 comprising:
   a back shell mounted on the back frame and having a recessed channel and a slotted opening;
   a shoulder harness passing through the slotted opening and in the recessed channel; and
   an inertial reel mounted on the vehicle seat and connected to the shoulder harness.

18. A vehicle seat as recited in claim 17 comprising:
   a back cover mounted on the back frame thereby covering from the back the slotted opening in the back shell and the recessed channel in the back shell containing the shoulder harness.

19. A seat as recited in claim 18 wherein the inertial reel is mounted under the vehicle seat.

20. A vehicle seat having an adjustable back portion comprising:
   a slotted opening in the back portion extending partially through the back portion and spaced from the top of the back portion;
   a shoulder harness having a first and a second extremity and extending through the slotted opening thereby coupling the shoulder harness to the back portion, the first extremity connected to the vehicle seat;
   an inertial reel mounted on the vehicle seat and connected to the second extremity of the shoulder harness;
   a seat back frame within the seat back, including connected structural members at the sides of the seat back and laterally surrounding the slotted opening in the seat back;
   a seat frame laterally surrounding a portion of the perimeter of the seat, extending rearward in a generally horizontal plane and then extending generally vertically upward adjacent to at least a portion of the seat back frame;

a pivot pin pivotably connecting the seat frame and the seat back frame; and a back support stop means spaced from the pivot pin, extending outwardly from the seat back frame and aligned to engage the seat frame extending generally vertically upward adjacent to at least a portion of the seat back frame when the seat back is rotated forwardly thereby reducing the moment arm of a force applied to said seat back.

21. A vehicle seat with a seat portion and a back portion comprising:

a seat back shell extending above shoulder height, having a slotted opening therethrough and a recessed channel from the slot to the bottom of the seat back shell;

a seat back frame supporting the seat back shell and including structural members at the sides of the seat back shell and laterally surrounding the slotted opening in the seat back shell;

a seat frame laterally surrounding a portion of the perimeter of the seat portion, extending rearward in a generally horizontal plane and then extending generally vertically upward adjacent to at least a portion of the seat back frame;

a pivot pin pivotally connecting the seat frame and the seat back frame;

a back support stop pin spaced from the pivot pin, extending outwardly from the seat back frame and aligned to engage the seat frame extending generally vertically upward adjacent to at least a portion of the seat back frame when the seat back is rotated forward;

an adjustment mechanism spaced from the pivot pin, hingedly connecting the back frame and the seat frame for securing the seat back portion in a plurality of positions with respect to the vertical;

a shoulder harness connected to the vehicle seat, passing through the slotted opening and extending down through the recessed channel;

a back cover mounted on the back frame thereby covering the back of the slotted opening in the back shell and the recessed channel in the back shell containing the shoulder harness; and an inertial reel mounted on the vehicle seat and connected to the shoulder harness passing through the recessed channel of the seat back shell.

22. A vehicle seat as recited in claim 21 wherein the slotted opening is approximately at shoulder height.

23. A vehicle seat as recited in claim 22 wherein a gusset is connected to the seat frame at the junction of the rearward extending portion in a generally horizontal plane and an upward extending portion in a generally vertical plane.

* * * * *